M. A. & D. F. MORTON.
Fruit-Gatherer.
No. 65,416. Patented June 4, 1867.
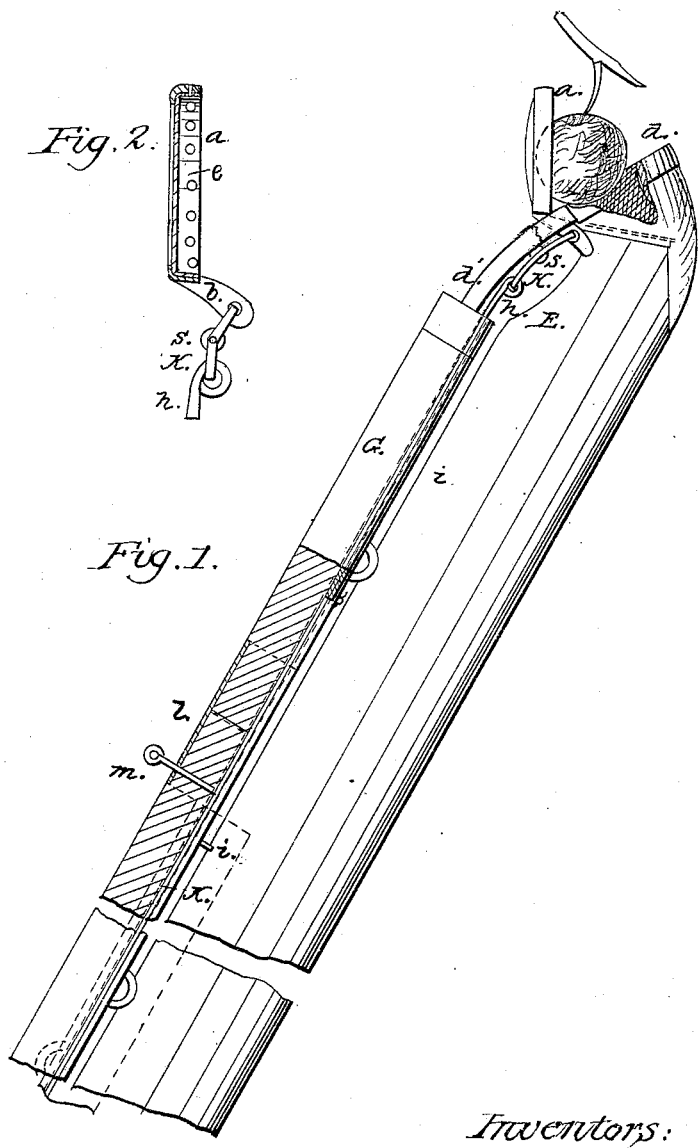
Witnesses:
Henry Kirby
H. A. Wolcott
Inventors:
M. A. Morton
D. F. Morton
by J. Fraser & Lee
attys.

United States Patent Office.

M. A. MORTON AND D. F. MORTON, OF ANGOLA, NEW YORK.

Letters Patent No. 65,416, dated June 4, 1867.

---

FRUIT-GATHERER.

---

The Schedule referred to in these Letters Patent and making part of the same.

---

TO ALL WHOM IT MAY CONCERN:

Be it known that we, M. A. and D. F. MORTON, of Angola, in the county of Erie, and State of New York, have invented certain new and useful improvements in Fruit-Gatherers; and we do hereby declare that the following is a full and exact description thereof, reference being had to the accompanying drawings, in which—

Figure 1 is a vertical elevation of our improved instrument with portions in section.

Figure 2 is a section of the diaphragm $e$ detached, showing also the bent link $k$ and eye of the rod $h$.

Like letters designate corresponding parts in both figures.

Our improvements relate to that class of instruments for plucking or gathering fruit in which jaws fixed to the end of a pole are employed to pluck the fruit, which is conducted safely to the ground through a flexible tube connected with one jaw; and said improvements consist, first, of disk of leather or other yielding fabric strained upon a ring in place of the usual jaw to push the fruit into the tube or sack without bruising it; second, the curved link and friction-roller $s$ connecting the actuating-rod with the lever by which said disk is operated; and third, in the manner of constructing the pole and actuating-rod in sections for readily disconnecting and packing in a small compass.

In the several inventions heretofore patented and in use for plucking fruit from the tree jaws or concave frames are formed, usually hemispherical in shape, and generally provided with knives for cutting the fruit from the bough by severing the stem. The objection to their use is that these metallic jaws, especially when provided with knives, bruise and mar the skin or surface so as to induce decay. Our device, especially designed to prevent this, consists of a mere rim, $a$, attached to a short lever, $b$, which is jointed to the fixed frame $d$, so as to vibrate to and from it, and having stretched across it a diaphragm, $e$, of leather or other suitable material sufficiently elastic to not injure the fruit, and tense enough to push the apple or other fruit through the rigid frame $d$ into the mouth of receiving-tube or sack E. By this action the stem is not cut or the apple marred, but simply pushed by the yielding disk $e$ into the tube, and held until the stem is drawn from the bough, and the fruit falls down the sack tube. If further force is required to separate it, which is seldom the case, it is exerted by the pole G, the apple being held by the diaphragm $e$ so gently that it cannot receive the slightest injury. This improvement is of real importance, because the commercial value of winter fruit depends on its long keeping, and apples cannot be preserved unless free from the injuries which it is impossible to prevent in using the cutters with the ordinary metallic jaws. Another feature of our invention consists in the construction of the curved connecting-link which connects the actuating-rod $h$ with the lever $b$, in combination with the bent shank $d'$. The bending of this shank is of obvious advantage, as it suspends the mouth of the tube E below it in the most favorable position to receive the apple when the instrument is reached up into a tree. With this construction the diaphragm rim $a$ could not be actuated by a thrust of the rod $h$ without the intermediate connection of the link $k$ with a curvature, which transmits the endwise movement of $h$ laterally from the shank $d'$, as well as longitudinally of it. A friction-roller, $s$, pivoted in the curve of the link, and having a bearing on the shank, is employed to prevent friction, and facilitate the direction of the force laterally from that of the shank. To enable an instrument of considerable length to be packed in a small compass and be more portable, I provide for jointing the pole G and rod $h$ in sections. This is done by the ferrule $l$, fixed to one section, and holding the end of the other, which is only removable by withdrawing the pin $m$. As the rod $h$ lies in a groove in the side of these pole sections, in which it is held by guides or loops $i$, at intervals (which also serve for attaching the sack tube E,) it is essential that both should be alike disjointed. We therefore provide the rod $h$ with screw sockets $j$ at intervals corresponding with the length of the sections of the pole G. The pole has sufficient slide motion on the rod to allow of withdrawing one section from the socket $l$ when the pin is removed; and, this being done, it is revolved around the rod $h$ (as shown in fig. 1) until the screw socket $j$ is separated. This is repeated at each joint; and to reunite them the process is the same, except that the sections of rod $h$ have first to be united.

What we claim as our invention, and desire to secure by Letters Patent, is—

A fruit-picker, constructed, arranged, and operating substantially as herein set forth.

In witness whereof we have hereunto signed our names in the presence of two subscribing witnesses.

M. A. MORTON,
D. F. MORTON.

Witnesses:
J. A. DAVIS,
CYRUS WILCOX.